US012120803B2

(12) United States Patent
Heimerdinger

(10) Patent No.: US 12,120,803 B2
(45) Date of Patent: Oct. 15, 2024

(54) COOKING APPLIANCE WITH VARIABLE MICROWAVE AND TURNTABLE TIMING

(71) Applicant: Haier US Appliance Solutions, Inc., Wilmington, DE (US)

(72) Inventor: Mark Heimerdinger, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 400 days.

(21) Appl. No.: 16/927,243

(22) Filed: Jul. 13, 2020

(65) Prior Publication Data

US 2022/0015200 A1 Jan. 13, 2022

(51) Int. Cl.
*H05B 6/68* (2006.01)
*H05B 6/64* (2006.01)

(52) U.S. Cl.
CPC ........... *H05B 6/687* (2013.01); *H05B 6/6411* (2013.01); *H05B 6/6485* (2013.01)

(58) Field of Classification Search
CPC .... H05B 6/6411; H05B 6/687; H05B 6/6473; H05B 6/6485; H05B 6/68; H05B 6/782; H05B 6/64; H05B 6/78; H05B 6/80; Y02B 40/00; F24C 7/02; F24C 7/08; A47J 37/06
See application file for complete search history.

(56) References Cited

U.S. PATENT DOCUMENTS

| | | | | |
|---|---|---|---|---|
| 5,440,105 A * | 8/1995 | Kim | H05B 6/6411 219/754 |
| 5,986,249 A * | 11/1999 | Yoshino | H05B 6/688 219/754 |
| 5,990,454 A | 11/1999 | Westerberg et al. | |
| 6,107,615 A | 8/2000 | Choi | |
| 6,166,363 A * | 12/2000 | Shon | H05B 6/687 219/709 |
| 6,528,772 B1 | 3/2003 | Graves et al. | |
| 6,815,644 B1 | 11/2004 | Muegge et al. | |
| 7,133,739 B2 | 11/2006 | Salton | |
| 8,124,920 B1 * | 2/2012 | Weber | H05B 6/6411 219/754 |
| 8,173,942 B2 | 5/2012 | Wiseman et al. | |
| 8,766,151 B1 * | 7/2014 | Weber | H05B 6/6411 219/754 |

(Continued)

FOREIGN PATENT DOCUMENTS

| | | |
|---|---|---|
| CN | 1779368 A | 5/2006 |
| CN | 109539337 A | 3/2019 |

(Continued)

*Primary Examiner* — Dana Ross
*Assistant Examiner* — Adam M Eckardt
(74) *Attorney, Agent, or Firm* — Dority & Manning, P.A.

(57) ABSTRACT

A method of operating cooking appliance includes receiving, by a controller of the cooking appliance, an input indicating a time of a cooking operation. The method also includes activating a motor to rotate a turntable within a cooking cavity defined in a casing of the cooking appliance throughout the time of the cooking operation and activating a microwave module to deliver microwave energy into the cooking cavity during at least a portion of the rotation of the turntable. The method further includes varying at least one of a speed of the rotation of the turntable and a duty cycle of the microwave module during the cooking operation.

13 Claims, 11 Drawing Sheets

(56) References Cited

U.S. PATENT DOCUMENTS

| | | | | |
|---|---|---|---|---|
| 10,223,933 | B1 | 3/2019 | Cheng et al. | |
| 2007/0045303 | A1 | 3/2007 | Smith | |
| 2009/0236332 | A1 | 9/2009 | Adams | |
| 2017/0223774 | A1 | 8/2017 | Cheng et al. | |
| 2019/0139446 | A1 | 5/2019 | Cheng et al. | |
| 2022/0141928 | A1* | 5/2022 | Hong | H05B 6/68<br>219/702 |

FOREIGN PATENT DOCUMENTS

| | | | |
|---|---|---|---|
| DE | 19845165 | A1 | 4/2000 |
| JP | 2002048347 | A | 2/2002 |
| KR | 920006924 | B1 | 8/1992 |
| KR | 101192349 | B1 | 10/2012 |
| WO | WO2013127897 | A1 | 9/2013 |

* cited by examiner

COOKING APPLIANCE WITH VARIABLE MICROWAVE AND TURNTABLE TIMING

FIELD OF THE INVENTION

The subject matter of the present disclosure relates generally to cooking appliances, and more particularly to cooking appliances including a turntable and a microwave module.

BACKGROUND OF THE INVENTION

Some cooking appliances, such as microwave ovens, have variable power levels. For example, a microwave oven may be operable at a range of distinct power levels, which may be quantified, e.g., as percentages. Such cooking appliances typically provide the variable power levels by activating an energy source, such as a magnetron, over less than all of a duty cycle to provide less than full power. For example, a ten percent power level may be provided by activating the energy source for ten percent of the duty cycle.

Such cooking appliances typically activate the energy source over the same portion of each duty cycle when there are multiple duty cycles during a cooking operation. For example, the ten percent power level may be provided by activating the energy source during the first ten percent of each duty cycle.

In order to provide even heating of items within the cooking appliance, such cooking appliances generally include a turntable to rotate the items within the cooking appliance. For example, when the energy source is a microwave energy source such as a magnetron, the microwave energy field generated by the magnetron may vary within the cooking appliance and over time. Accordingly, the rotation of the turntable allows the items to be exposed to a more uniform level of microwave energy within the cooking appliance. Such cooking appliances typically rotate the turntable at a fixed speed. The fixed speed of rotation also may correspond to the duty cycle of the energy source, such that the turntable completes one full revolution for every duty cycle.

However, when the energy source is only activated during a portion of the duty cycle and that portion is the same over each duty cycle, the same portion of the turntable is repeatedly directly exposed to the microwave energy while the remainder of the turntable is never directly exposed to the microwave energy. This may result in uneven heating of items on the turntable.

Accordingly, cooking appliances and methods for operating the same that address one or more of the challenges noted above would be desirable. In particular, cooking appliances and methods for operating the same that provide more evenly distributed energy delivery to the turntable when operating at less than full power would be beneficial.

BRIEF DESCRIPTION OF THE INVENTION

Aspects and advantages of the invention will be set forth in part in the following description, or may be apparent from the description, or may be learned through practice of the invention.

In one exemplary embodiment, a method of operating a cooking appliance is provided. The method includes receiving, by a controller of the cooking appliance, an input indicating a time of a cooking operation. The method also includes activating a motor to rotate a turntable within a cooking cavity defined in a casing of the cooking appliance throughout the time of the cooking operation and activating a microwave module to deliver microwave energy into the cooking cavity during at least a portion of the rotation of the turntable. The method further includes varying at least one of a speed of the rotation of the turntable and a duty cycle of the microwave module during the cooking operation.

In another exemplary embodiment, a method of operating a cooking appliance is provided. The method includes receiving, by a controller of the cooking appliance, an input indicating a time of a cooking operation. The method also includes activating a motor to rotate a turntable within a cooking cavity defined in a casing of the cooking appliance at a first speed during a first portion of the time of the cooking operation and at a second speed different from the first speed during a second portion of the time of the cooking operation. The method further includes activating a microwave module to deliver microwave energy into the cooking cavity during at least a portion of the cooking operation.

In still another exemplary embodiment, a method of operating a cooking appliance is provided. The method includes receiving, by a controller of the cooking appliance, an input indicating a time of a cooking operation. The method also includes activating a motor to rotate a turntable within a cooking cavity defined in a casing of the cooking appliance throughout the time of the cooking operation and activating a microwave module to deliver microwave energy into the cooking cavity during at least a portion of the rotation of the turntable. The method further includes varying a duty cycle of the microwave module during the cooking operation.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
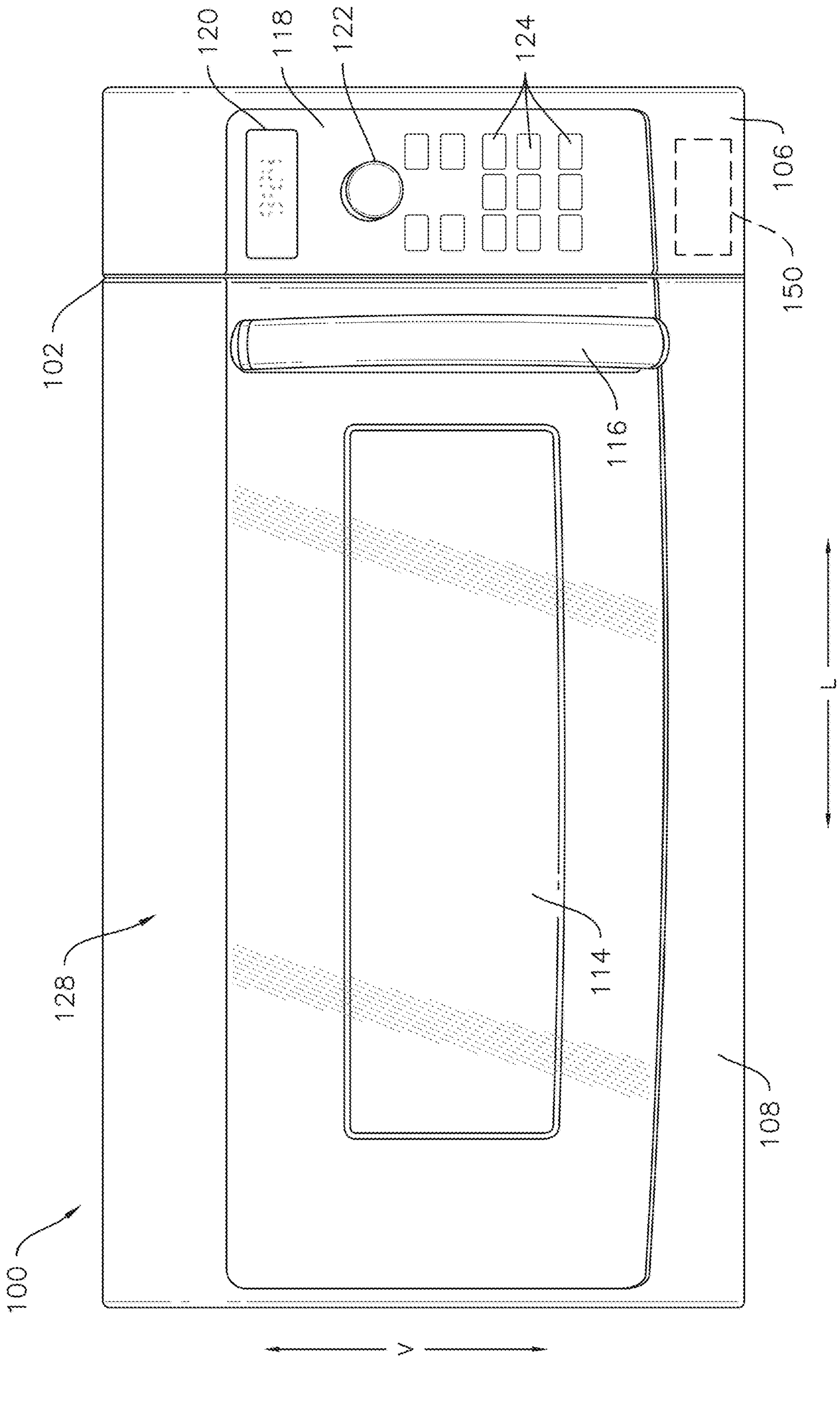
FIG. 1 provides a front view of a cooking appliance according to one or more example embodiments of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents. As used herein, terms of approximation, such as "approximately," "substantially," or "about," refer to being within a ten percent (10%) margin of error of the stated value. Moreover, as used herein, the terms "first," "second," and "third" may be used interchangeably to distinguish one component from another and are not intended to signify location or importance of the individual components.

FIG. 1 provides a front view of a cooking appliance 100 according to an example embodiment of the present subject matter. Cooking appliance 100 may, in some example embodiments, be an "over-the-range" oven. In other example embodiments, the cooking appliance 100 may be a countertop oven, a wall oven, or may be provided in various other oven configurations as will be recognized by those of skill in the art. The illustrated cooking appliance 100 includes multiple heat sources, as will be described in more detail below. The cooking appliance 100 with multiple diverse heat sources is provided as a non-limiting example of some embodiments of the present disclosure. In other embodiments, the cooking appliance 100 may include only one or more microwave sources as the only thermal energy sources for cooking in the cooking appliance 100, e.g., in some embodiments, the cooking appliance 100 may be a microwave oven.

Cooking appliance 100 includes a housing or casing 102 that defines a cooking cavity 128. Food items can be received within cooking cavity 128. A door 108 is rotatably mounted to casing 102 and is movable between an open position and a closed position (shown in FIG. 1) to provide selective access to cooking cavity 128. A window 114 in door 108 is provided for viewing food items in the cooking cavity 128, and a handle 116 is secured to door 108. Handle 116 can be formed of plastic, for example, and can be injection molded.

Figure 2:
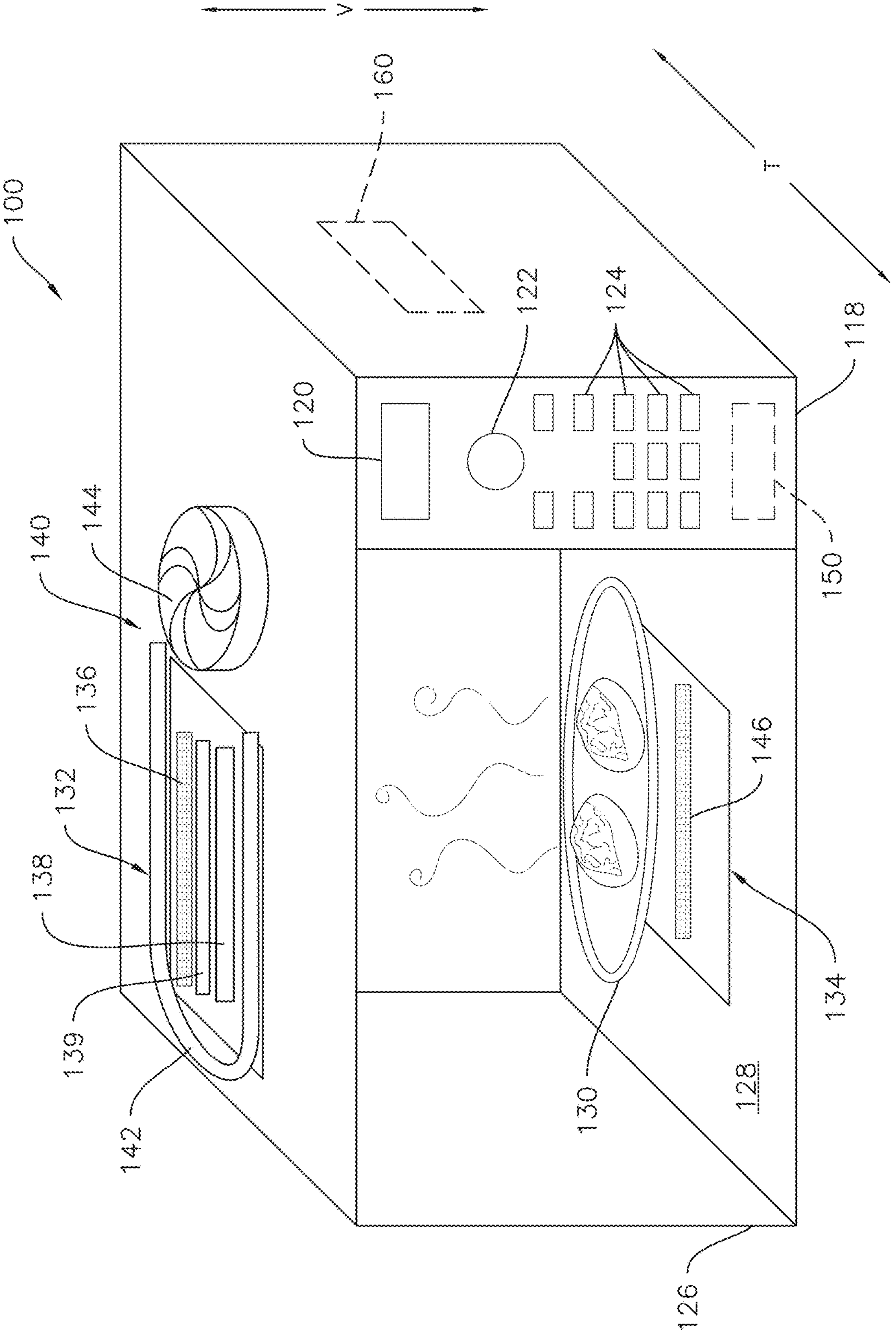
FIG. 2 provides a schematic perspective view of a cooking appliance according to one or more example embodiments of the present subject matter.
Figure 3:
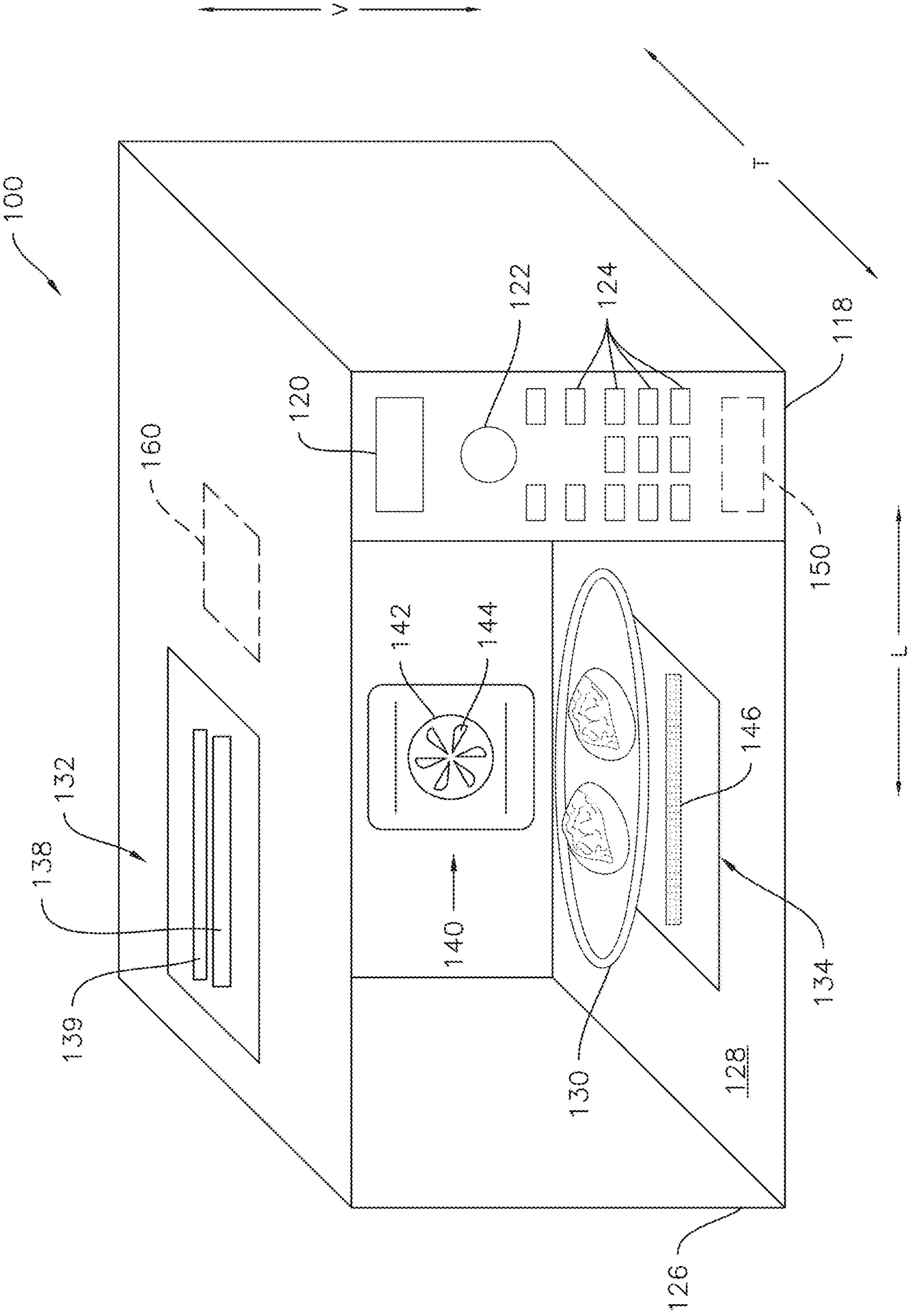
FIG. 3 provides a schematic perspective view of a cooking appliance according to one or more additional example embodiments of the present subject matter.

As may be seen, e.g., in FIGS. 1 through 3, the cooking appliance 100 may define a vertical direction V, a lateral direction L, and a transverse direction T. The vertical direction V, the lateral direction L, and the transverse direction T may be mutually perpendicular. In particular, the cooking appliance 100 may extend between a top and a bottom along the vertical direction, between a left side and a right side along the lateral direction L, and between a front and a back along the transverse direction T. For example, "front," "back," "left," and "right" may be defined from the perspective of a user standing in front of the cooking appliance 100 to access the cooking cavity 128 therein, e.g., via the door 108.

Cooking appliance 100 also includes a control panel frame 106. A control panel 118 is mounted within control panel frame 106. Control panel 118 includes a display device 120 for presenting various information to a user. Control panel 118 also includes one or more input devices. For this embodiment, the input devices of control panel 118 include a knob or dial 122 and tactile control buttons 124. Selections are made by rotating dial 122 clockwise or counter-clockwise, and when the desired selection is displayed, pressing dial 122. For example, many meal cook cycles and other cooking algorithms can be preprogrammed in or loaded onto a memory device of a controller 150 of cooking appliance 100 for many different food items types (e.g., pizza, fried chicken, French fries, potatoes, etc.), including simultaneous preparation of a group of food items of different food types comprising an entire meal. Additionally, new or updated meal cook cycles and/or recipes may be downloaded to the memory device of the controller 150, such as from a remote database, e.g., a cloud server, via a network communications module of the controller 150 and stored in the memory device. When a user is cooking a particular food item or group of food items for which there is a stored or preprogrammed cooking algorithm or recipe (including cooking algorithms or recipes which are downloaded from the internet or cloud), the cooking algorithm can be selected by rotating dial 122 until the selected food name is displayed and then pressing dial 122. Instructions and selections are displayed on display device 120. Furthermore, in some embodiments, display device 120 can also be used as an input device. For instance, in such embodiments, display device 120 can be a touchscreen device. In some embodiments, display device 120 is the only input device of control panel 118.

FIG. 2 provides a schematic view of cooking appliance 100 in one or more example embodiments and FIG. 3 provides a schematic view of cooking appliance 100 in one or more additional example embodiments. As shown in FIGS. 2 and 3, in some example embodiments, casing 102 (FIG. 1) of cooking appliance 100 includes a shell 126. Shell 126 of casing 102 delineates the interior volume of cooking cavity 128. The walls of shell 126 may be constructed using high reflectivity (e.g., 72% reflectivity) stainless steel. A turntable 130 is located in cooking cavity 128 and is rotatable about an axis of rotation, e.g., for rotating food items during a cooking operation.

Further, cooking appliance 100 includes a microwave module 160, an upper heater module 132, a lower heater module 134, and a convection module 140. In the example embodiment of FIG. 2, the convection module 140 is positioned above the cooking cavity 128. FIG. 3 schematically illustrates an additional example embodiment of the cooking appliance 100, where the convection module 140 (including sheath 142 and convection fan 144) is provided at a back of the cooking cavity 128. In some embodiments, microwave module 160 is located on a side of cooking cavity 128 (e.g., as illustrated in FIG. 2), while in other example embodiments, the microwave module 160 may be located above the cooking cavity 128 (e.g., as illustrated in FIG. 3). The microwave module 160 delivers microwave energy into cooking cavity 128. In some embodiments, the microwave module 160 includes a magnetron to provide the microwave energy. Upper heater module 132 can include one or more heating elements. For instance, upper heating module 132 can include one or more halogen cooking lamps and/or one or more ceramic heaters. For the depicted embodiment of FIG. 2, upper heating module 132 includes a ceramic heater 136 and a halogen cooking lamp 138. In some example embodiments, upper heater module 132 has at least two halogen lamps 138, 139 configured to deliver radiant and thermal energy into the cooking cavity 128, such as in the example embodiment depicted in FIG. 3.

Convection module 140 includes a sheath heater 142 and a convection fan 144. Convection fan 144 is provided for blowing or otherwise moving air over sheath heater 142 of convection module 140 and into cooking cavity 128, e.g., for convection cooking. Lower heater module 134 includes at least one heating element. The heating element of lower heater module 134 can be a ceramic heater or a halogen lamp, for example. For the example embodiments illustrated in FIGS. 2 and 3, the heating element of lower heater module 134 is illustrated as a ceramic heater 146. In various embodiments, cooking appliance 100 may be a 240V cooking appliance or a 120V cooking appliance, for example.

The specific heating elements of upper and lower heater modules 132, 134, convection module 140, and microwave generation system of microwave module 160 (e.g., a magnetron) can vary from embodiment to embodiment, and the elements and systems described above are exemplary only. For example, the upper heater module 132 can include any combination of heaters including combinations of halogen lamps, ceramic lamps, and/or sheath heaters. Similarly, lower heater module 134 can include any combination of heaters including combinations of halogen lamps, ceramic lamps, and/or sheath heaters. In addition, the heaters can all be one type of heater. The specific ratings and number of lamps and/or heaters utilized in the upper and lower modules 132, 134 and convection module 140 can vary from embodiment to embodiment. Generally, the combinations of lamps, heaters, and microwave generation system is selected to provide the desired cooking characteristics for precision cooking in various modes and/or operations.

As shown in FIGS. 1 and 2, cooking appliance 100 includes controller 150. Controller 150 of cooking appliance 100 can include one or more processor(s) and one or more memory device(s). The processor(s) of controller 150 can be any suitable processing device, such as a microprocessor, microcontroller, integrated circuit, or other suitable processing device. The memory device(s) of controller 150 can include any suitable computing system or media, including, but not limited to, non-transitory computer-readable media, RAM, ROM, hard drives, flash drives, or other memory devices. The memory device(s) of controller 150 can store information accessible by the processor(s) of controller 150 including instructions that can be executed by the processor (s) of controller 150 in order to execute various cooking operations or cycles. Controller 150 is communicatively coupled with various operational components of cooking appliance 100, such as components of microwave module 160, upper heater module 132, lower heater module 134, convection module 140, and control panel 118, including display device 120, dial 122, the various control buttons 124, etc. Input/output ("I/O") signals may be routed between controller 150 and control panel 118 as well as other operational components of cooking appliance 100. Controller 150 can execute and control cooking appliance 100 in various cooking operations or cycles, such as precision cooking, which includes meal cook, microwave, and convection/bake modes.

Cooking appliance 100 can operate in various modes or cycles, and the descriptions set forth herein are exemplary only. In addition, operation and use of cooking appliance 100 is not limited to a specific order of steps. Various steps can be performed in orders different from the exemplary order described below.

In some embodiments, the cooking appliance 100 may be operable in one or more convection/bake modes. In one example convection/bake mode, a user selects "Convection/Bake" from control panel 118, and then uses dial 122 to select a temperature and cook time. Lower ceramic heater 146 and sheath heater 142 are then energized to preheat the air in cooking cavity 128. The food is then placed in cooking cavity 128 and cooking begins. During the cooking cycle, convection fan 144 circulates air to assure even cooking. Controller 150 can activate convection fan 144 (e.g., via one or more command signals) such that convection fan 144 moves air over sheath heater 142, and in some embodiments heating elements of upper heater module 132. In this way, heated air is moved into cooking cavity 128, e.g., for convection cooking.

Cooking appliance 100 may also operate in one or more microwave modes, for example a microwave only mode, or the microwave module 160 may operate in conjunction with one or more various other heating modules in other modes. Generally, for the modes which utilize microwave module 160, the user places food in cooking cavity 128 on turntable 130. The user then selects "Microwave," "Express," or other applicable cooking mode from control panel 118. Dial 122 can be utilized to select a food type, and once the food type is selected, the user selects "Start" from control panel 118. The microwave module 160 is then energized in accordance with the user selections. In some embodiments, the user can select the desired cook time and power level and then may select "START" to commence the microwave only cooking operation.

In some embodiments, the cooking appliance 100 may operate one or more of the convection module 140, the lower heating module 134, the upper heating module 132, and the microwave module 160 in various combinations during a single cycle. For example, some embodiments may include operating two or more of the modules at various times, sequentially and/or simultaneously, during a single cycle.

As mentioned above, the turntable 130 may be rotatably mounted in the cooking cavity 128. The turntable 130 and may be coupled to a motor (not shown) such that the turntable 130 rotates when the motor is activated. The motor may be any suitable motor for providing rotational motivating force to the turntable 130. In some exemplary embodiments, the motor may be a stepper motor or any other suitable motor capable of the necessary motion control (velocity, direction, speed, and acceleration), as will be recognized by those of skill in the art. The structure and function of motors are generally understood by those of skill in the art and, as such, are not shown or described in further detail herein for the sake of brevity and clarity.

In at least some example embodiments, the turntable 130 may be indexed, e.g., with a poka-yoke connection, to ensure that the angular position of the turntable 130 within the cooking cavity 128 is fixed, e.g., relative to the motor. With such indexed connection, the position of the turntable may be known based on the position or state of the motor, e.g., when the motor is a stepper motor. Also by way of example, in at least some embodiments, a position switch or sensor, such as a Hall effect sensor, may be provided in one or both of the turntable 130 and the housing 102 such that the angular position of the turntable 130 may be known, e.g., based on a signal from the position sensor received by the controller 150.

In at least some embodiments, rotating the turntable 130 within the cooking cavity 128 may be performed while selectively activating and/or adjusting at least one of the microwave module 160, the upper heater module 132, the lower heater module 134, and the convection module 140. In various embodiments, rotation of the turntable 130 may include one or more of: rotating at varying rotational speeds, moving the turntable 130 to an exact angular position, dwelling, and oscillating back and forth. The foregoing various embodiments and combinations thereof with respect to the rotation of the turntable 130 may be provided separately or in combination with several various embodiments of activating and/or adjusting one or more (up to and including all) of the heating modules.

Figure 4:
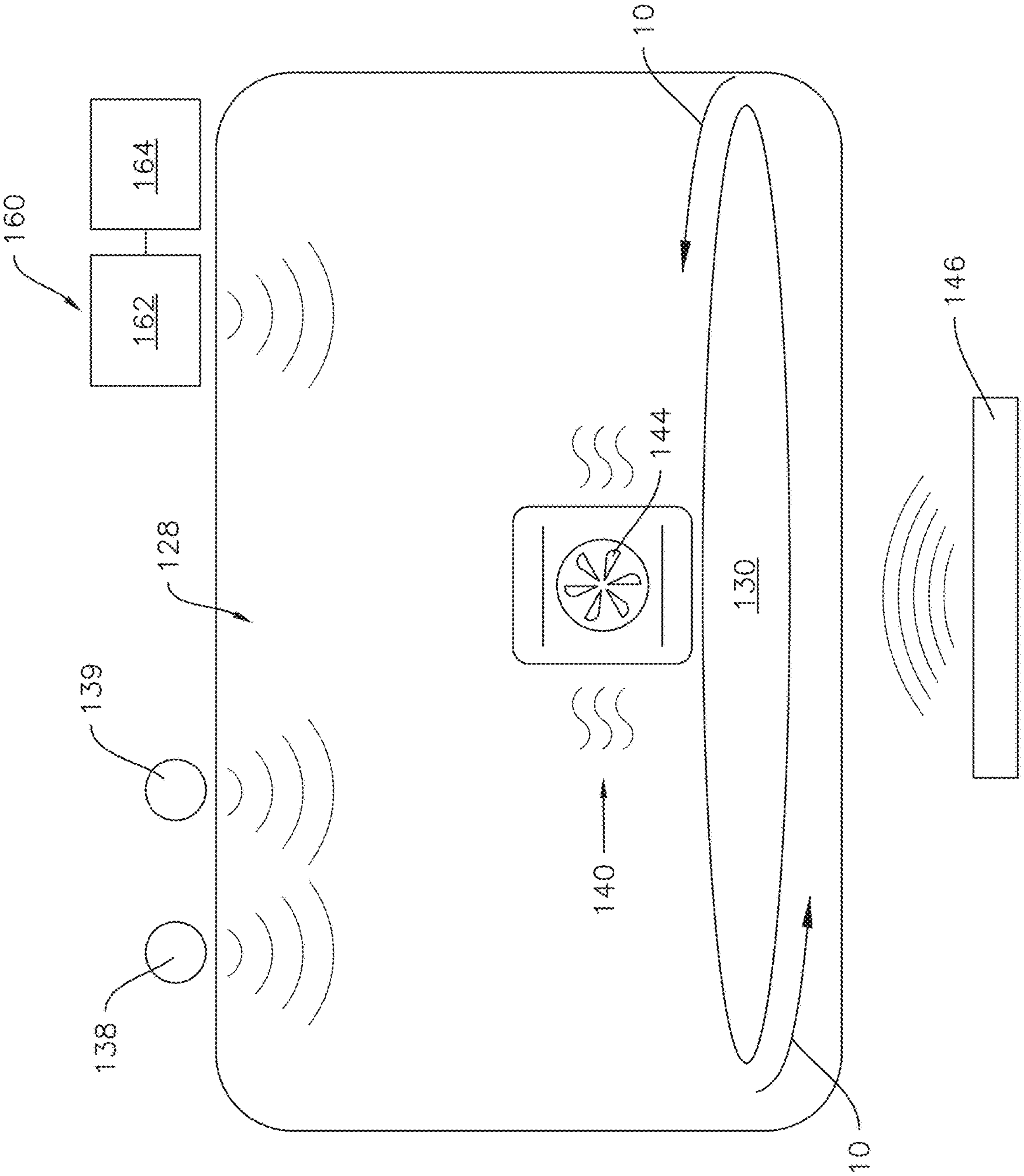
FIG. 4 provides a schematic perspective view of a cooking appliance according to one or more additional example embodiments of the present subject matter.

In some embodiments, e.g., as illustrated in FIG. 4, the microwave module 160 may include a magnetron 162 and a power supply 164. The power supply 164 may comprise a transformer power supply in some embodiments. In embodiments where the power supply 164 is a transformer power supply, activating the microwave module 160 at varying power levels during the cooking operation may be achieved by varying a duty cycle of the magnetron 162, e.g., by turning the magnetron 162 on and off at varying points throughout the cooking operation. The duty cycle may correspond to the time it takes for the turntable 130 to make a complete rotation (e.g., to rotate through an angle of 360°). For example, a ten percent (10%) duty cycle may comprise turning the magnetron 162 on through 10% of each revolution of the turntable 130, e.g., through about 36° of rotation of the turntable 130. The sequence of activating and deactivating the magnetron 162 may be staggered such that different segments of the turntable 130 are most proximate (relative to the remainder of the turntable 130) to the microwave module 160 each time the magnetron 162 is turned on, e.g., in embodiments such as those illustrated in FIGS. 2 and 3, where the microwave module 160 is not centered with the cooking cavity 128.

As mentioned above, terms of approximation used herein include a ten percent margin of error, e.g., in the context of the foregoing output power levels, a ten percentage point margin of error, such that about 10% power includes values greater than zero (and does not include zero power) up to twenty percent (20%), while about 95% includes values from eighty-five percent (85%) up to one hundred percent (100%).

Figure 5:
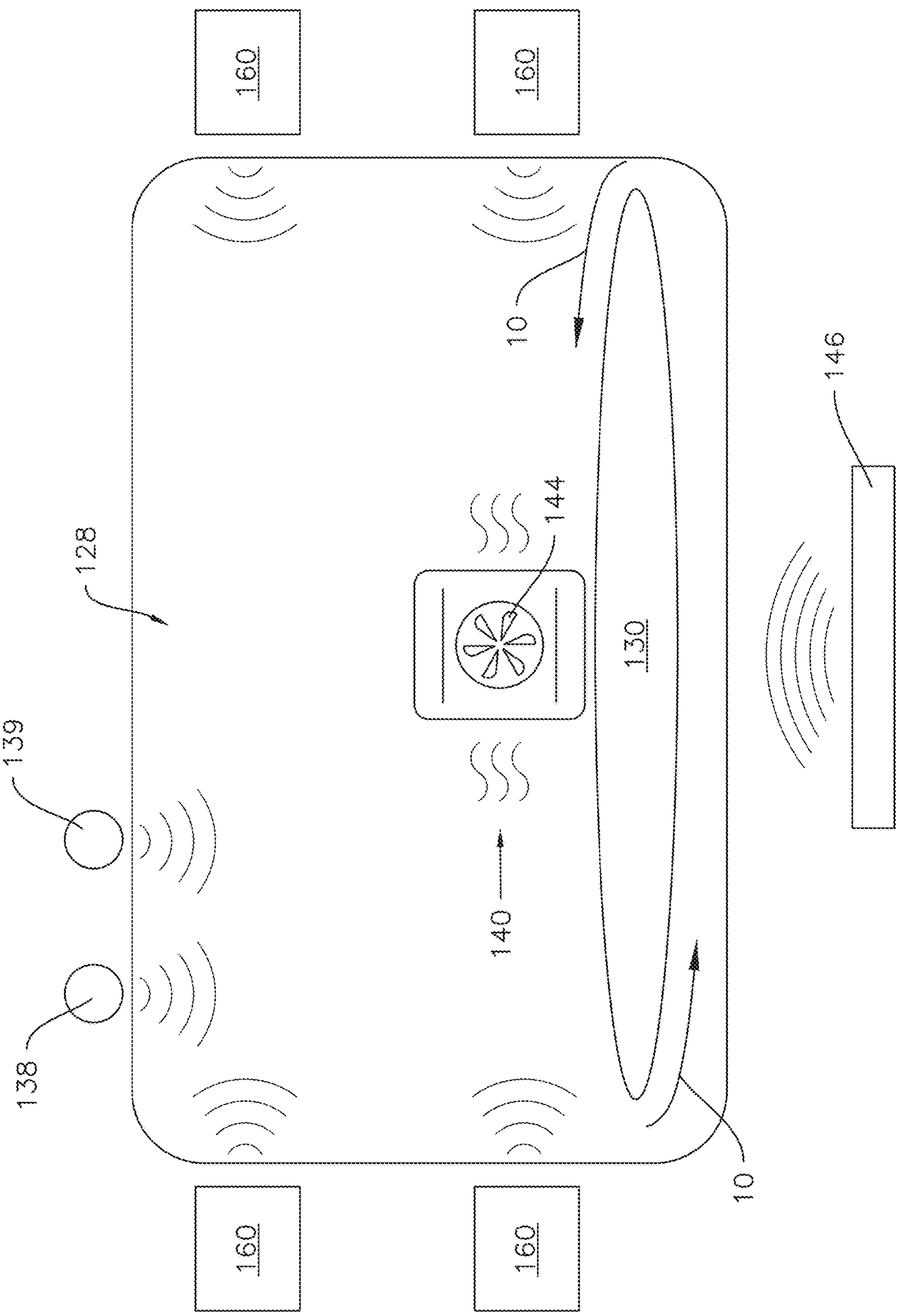
FIG. 5 provides a schematic perspective view of a cooking appliance according to one or more additional example embodiments of the present subject matter.

In some embodiments, as illustrated for example in FIG. 5, multiple microwave modules 160 may be provided at discrete locations within the cooking appliance 100. With this configuration, the output of each microwave module 160 may be varied throughout the cooking operation to selectively expose distinct spatial locations to the optimal or preferred amount of microwave energy, including varying the output power of each microwave module 160 correspondingly (e.g., synchronized) with the rotation of the turntable 130.

Figure 6:
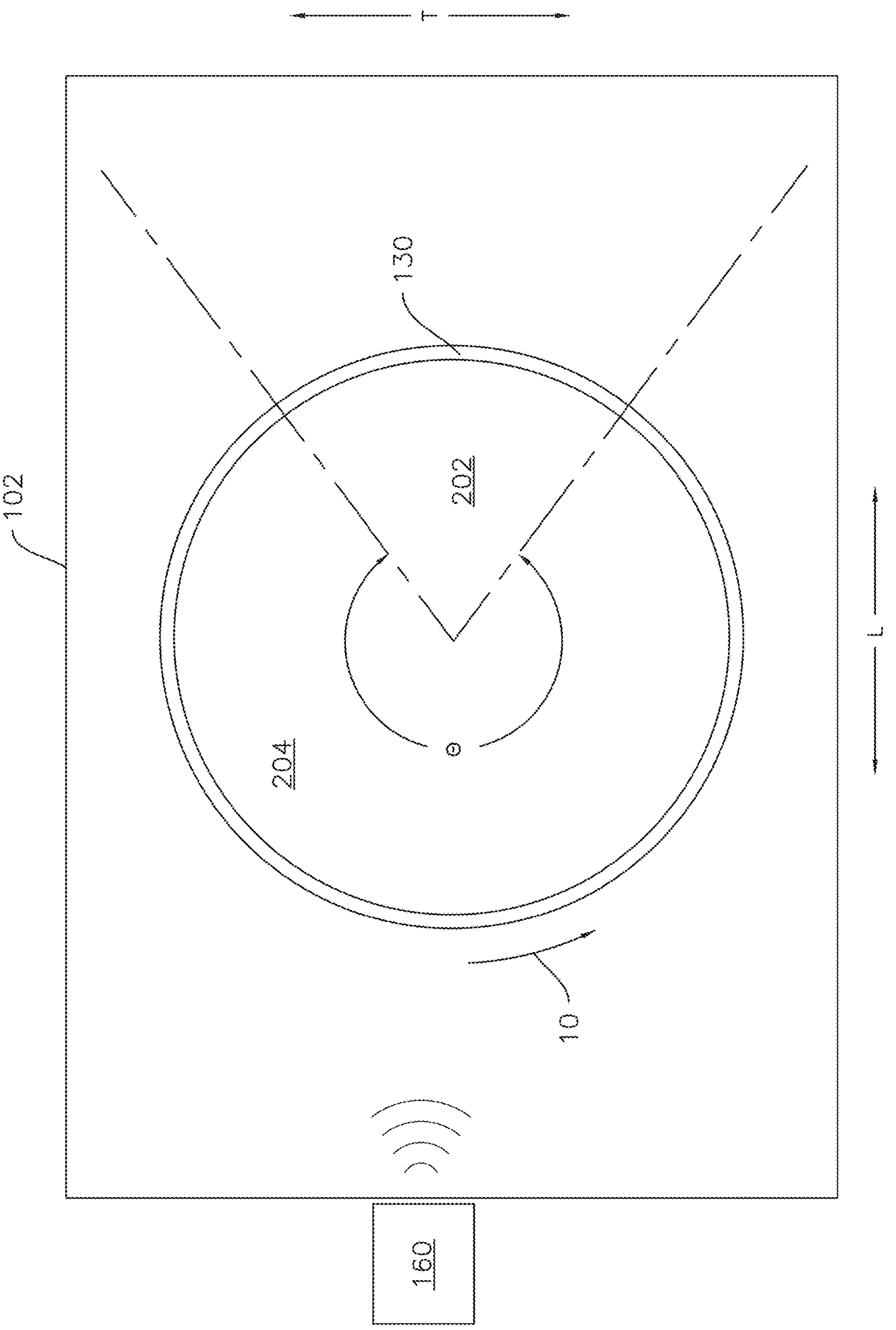
FIG. 6 provides a schematic top down view of components of a cooking appliance according to one or more additional example embodiments of the present subject matter.

In some embodiments, the cooking operation may include rotating the turntable 130 in a first direction 10, e.g., as indicated by arrows 10 in FIGS. 4 and 5, such as only rotating the turntable 130 in the first direction 10. In other embodiments, the cooking operation may also include alternately rotating the turntable 130 in the first direction 10 and a second direction, where the first and second direction 10 and 12 are coplanar (e.g., defined within the same plane) and are opposite. For example, the first direction 10 may be counterclockwise as illustrated in FIG. 6 and the second direction may be clockwise.

In various embodiments, the microwave module 160 may be located off-center relative to the cooking chamber 128, e.g., away from the geometric center of the cooking chamber 128. For example, as illustrated in FIG. 6, the microwave module 160 may be located to one side of the cooking chamber 128. FIG. 6 also schematically depicts a cooking operation at less than full power, such as about eighty percent (80%) power. Accordingly, the microwave module 160 may be activated during eighty percent (80%) of each duty cycle, and the turntable 130 may rotate through an angle theta (Θ) during the portion of an example duty cycle in which the microwave module 160 is activated, such that a first area 204 on the turntable 130 is directly exposed to the microwave module 160, while a second area 202 on the turntable 130 is not directly exposed to the microwave module 160 during the example duty cycle. When the rotation speed generally corresponds to the duty cycle time, e.g., when the duty cycle is about thirty seconds (30 s) and the rotation speed is about two revolutions per minute (2 RPM), or when the duty cycle is about twenty seconds (20 s) and the rotation speed is about three revolutions per minute (3 RPM), the angle Θ will be about eighty percent of a complete revolution or about two hundred eighty-eight degrees (288°), leaving a portion of the turntable 130 extending through an angle of about seventy-two degrees (72°) not directly exposed to the microwave module 160 while the microwave module 160 is activated (e.g., ON). Thus, the first area 204 will correspond to about eighty percent of the area of the turntable 130. In order to more evenly distribute the microwave energy across or around the turntable 130, the rotation speed of the turntable 130 may be varied, such that the angle Θ through which the turntable 130 rotates while the microwave module 160 is activated will vary, thereby reducing thermal concentration in any one area or portion of the turntable and providing more even thermal distribution to the turntable 130 and any food items thereon. For example, when the duty cycle is about thirty seconds (30 s), the turntable 130 may be rotated at about two revolutions per minute (2 RPM) during a first duty cycle or a first portion of a duty cycle, followed by rotating the turntable 130 at about three revolutions per minute (3 RPM) during a second duty cycle or a second portion of the duty cycle. For example, embodiments of the present disclosure may include accelerating, e.g., rotating at a higher speed, the turntable 130 while the microwave module 160 is active and/or decelerating, e.g., rotating at a lower speed, the turntable 130 during the portion of the duty cycle when the microwave module 160 is not activated.

By rotating the turntable 130 at a higher speed during the portion of the duty cycle when the microwave module 160 is activated, a greater proportion of the turntable 130 may be directly exposed to the microwave energy from the microwave module 160, e.g., the relative size of the first area 204 (relative to the overall size of the turntable 130) may be increased. For example, when the user-selected power level is eighty percent (80%) and the microwave module 160 is correspondingly activated during eighty percent (80%) of the duty cycle, and the duty cycle is about thirty seconds (30 s), rotating the turntable 160 at a higher speed, e.g., about 3 RPM as opposed to about 2 RPM, will permit a greater portion of the turntable 130 to be exposed to the microwave energy. As noted above, when the duty cycle is about thirty seconds (30 s) and the rotation speed is about two revolutions per minute (2 RPM), the angle Θ that is directly exposed to the microwave module 160 and/or microwave energy therefrom encompasses about 288° at 80% power. When the turntable 130 is rotated at a higher speed, e.g., about 3 RPM or 18 degrees per second, during the 80% of the duty cycle, e.g., 24 s which is 80% of the 30 s duty cycle, in which the microwave module 160 is activated, then the angle Q that is directly exposed to the microwave module 160 and/or microwave energy therefrom may be increased to about 432°, whereby the entire area of the turntable 130 is directly exposed to the microwave module 160 during the duty cycle and a portion (e.g., within an arc subtending an angle of about) 72° of the turntable 130 may be directly exposed to the microwave module 160 twice during the duty cycle.

By rotating the turntable 130 at a lower speed during the portion of the duty cycle when the microwave module 160 is deactivated, the proportion of the turntable 130 which is not directly exposed to the microwave energy from the microwave module 160 may be smaller, e.g., the relative size of the second area 202 (relative to the overall size of the turntable 130) may be decreased. For example, when the user-selected power level is eighty percent (80%) and the microwave module 160 is correspondingly deactivated during twenty percent (20%) of the duty cycle, and the duty cycle is about twenty seconds (20 s), rotating the turntable 160 at a lower speed, e.g., about 2 RPM as opposed to about 3 RPM, will result in a smaller portion of the turntable 130 not being directly exposed to the microwave energy. As noted above, when the duty cycle is about twenty seconds (20 s) and the rotation speed is about three revolutions per minute (3 RPM), the second area 202 that is not directly exposed to the microwave module 160 and/or microwave energy therefrom encompasses about seventy-two degrees (72°) at 80% power. When the turntable 130 is rotated at a lower speed, e.g., about 2 RPM or 12 degrees per second, during the 20% of the duty cycle, e.g., 4 s which is 20% of the 20 s duty cycle, in which the microwave module 160 is deactivated, then the second area 202 that is not directly exposed to the microwave module 160 and/or microwave energy therefrom may be decreased to about 48°.

Figure 7:
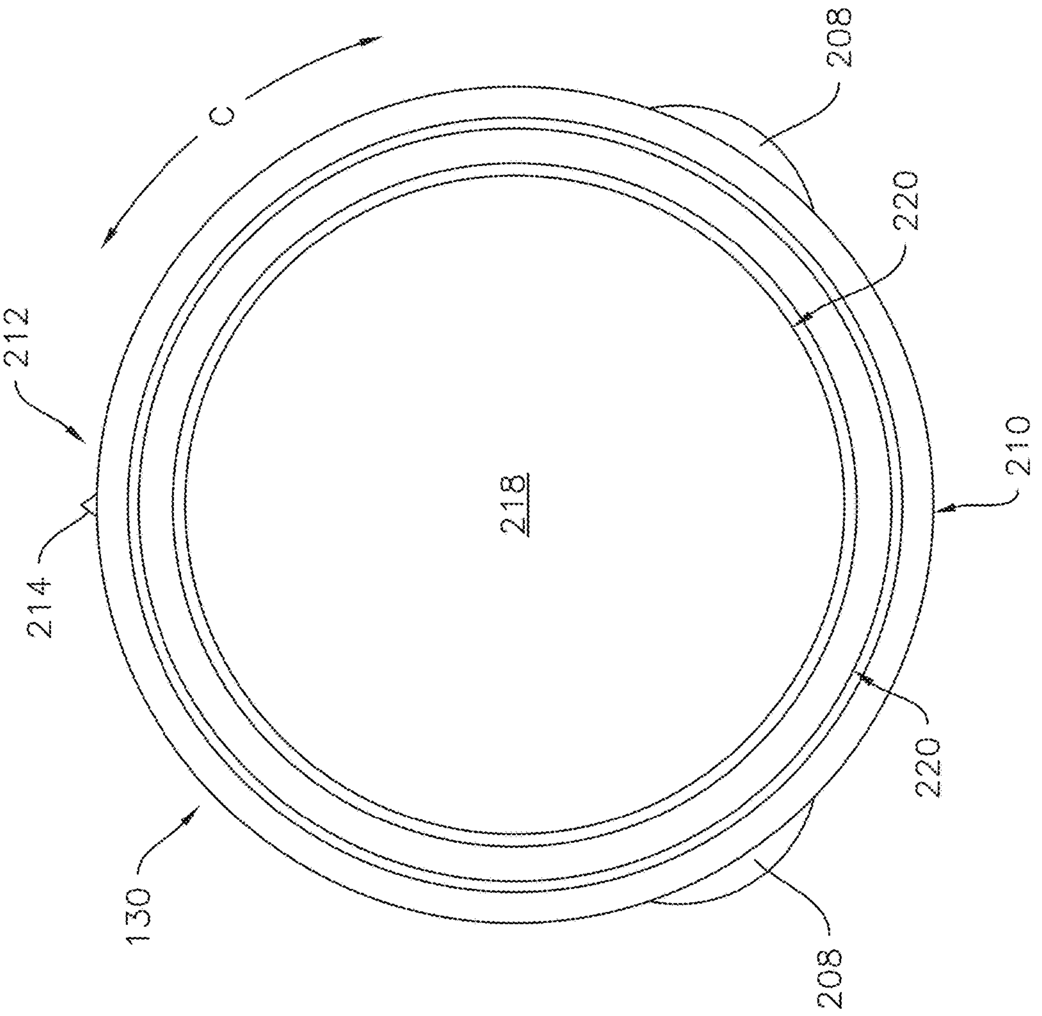
FIG. 7 provides a plan view of an exemplary turntable according to one or more example embodiments of the present subject matter.
Figure 8:
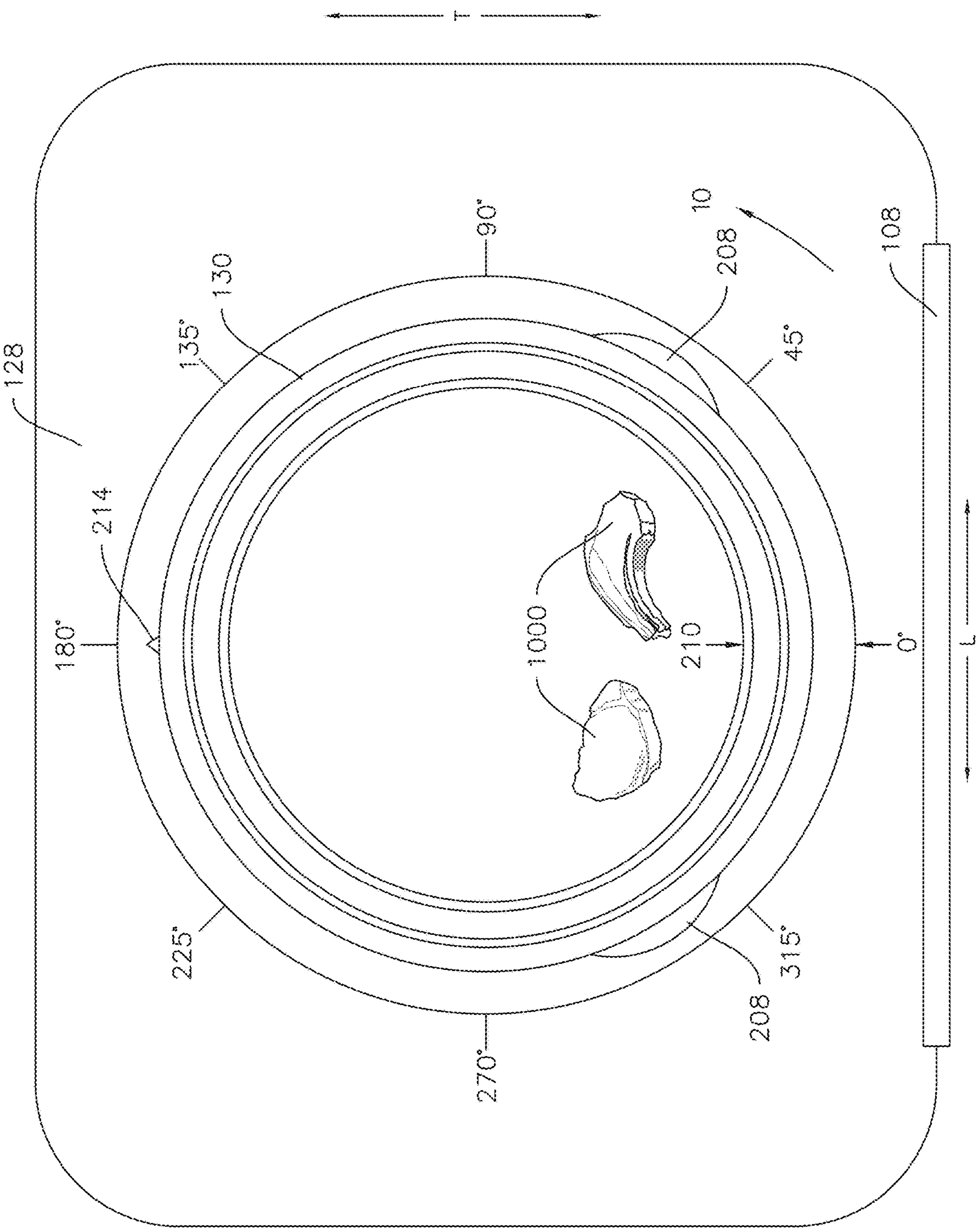
FIG. 8 provides a schematic illustration of an exemplary cooking appliance in a home position according to one or more additional example embodiments of the present subject matter.

As mentioned above, the turntable 130 may be rotatably mounted in the cooking cavity 128. For example, the turntable 130 may be rotatable through a plurality of positions, such as one or more predetermined positions. Further, in various embodiments, the speed of rotation may vary between positions, e.g., changes in speed of the turntable 130 may correspond to or occur at one or more of the plurality of positions. For instance, such changes in speed may include rotating from a first position of the plurality of positions to a second position of the plurality of positions at a first speed followed by rotating the turntable 130 from the second position of the plurality of positions to a third position of the plurality of positions at a second speed different from the first speed. In some embodiments, e.g., as illustrated in FIG. 7, the turntable 130 may be rounded or generally circular, whereby a circumferential direction C may be defined by a circumference of the turntable 130. As illustrated in FIG. 7, the turntable 130 may include a front 210 and a back 212 diametrically opposite the front 210. For example, the front 210 may be proximate the door 108 and centered within the cooking cavity 128 along the lateral direction L when the turntable 130 is in a home position (FIG. 8). The turntable 130 may also include one or more gutters 220 extending along or parallel to (e.g., concentric with) the circumferential direction C, a pair of handles 208 disposed between the front 210 and the back 212 along the circumferential direction C, and a spout 214 disposed at or around the back 212. In some embodiments, the plurality of positions of the turntable 130 may include a plurality of predetermined positions which equally spaced apart along the circumferential direction C. For example, the plurality of positions of the turntable 130 may include four predetermined positions each spaced apart from adjacent positions of the plurality of positions by ninety degrees. As another example, the plurality of positions of the turntable 130 may include eight predetermined positions each spaced apart from adjacent positions of the plurality of positions by forty five degrees.

In various embodiments, the rotation of the turntable 130 may be controlled by software, and may be controlled based on an operating mode of the cooking appliance 100, meal cook sequences, and/or user input. For example, in some embodiments, the turntable 130 may be configured to rotate to a home position when the door 108 is opened, e.g., as mentioned above, where the front 210 of the turntable 130 is proximate the door 108. Additionally, the turntable 130 may be rotatable to a user selected one of the plurality of predefined positions in response to a user input, e.g., via the control panel 118, such as buttons 124 thereon.

In some embodiments, the turntable 130 may rotate through the plurality of positions in a sequential order during at least a portion of the cooking operation, e.g., along a constant direction through at least the portion of the cooking operation. Additionally, in at least some embodiments, the turntable 130 may also be rotated, such as by the motor, to a predetermined one of the plurality of positions at a predetermined time. The predetermined time may correspond to a certain point in the cooking operation. For example, in some embodiments, the predetermined time may correspond to an end of the cooking operation. In some embodiments, the cooking operation may include a plurality of stages, and the predetermined time may correspond to one of the plurality of stages, such as the beginning of a stage, the end of the stage, or an intermediate point during the stage, etc.

The turntable 130 may rotate to the predetermined positions by changing the speed and/or direction of rotation. For example, in some embodiments, rotating the turntable 130 through the plurality of positions in the sequential order during at least the portion of the cooking operation may include rotating the turntable at a first speed, and rotating the turntable to the predetermined one of the plurality of positions at the predetermined time may include rotating the turntable at a second speed different from the first speed. As another example, rotating the turntable 130 to the predetermined one of the plurality of positions at the predetermined time may include rotating the turntable 130 through at least one of the plurality of positions out of the sequential order.

Figure 9:
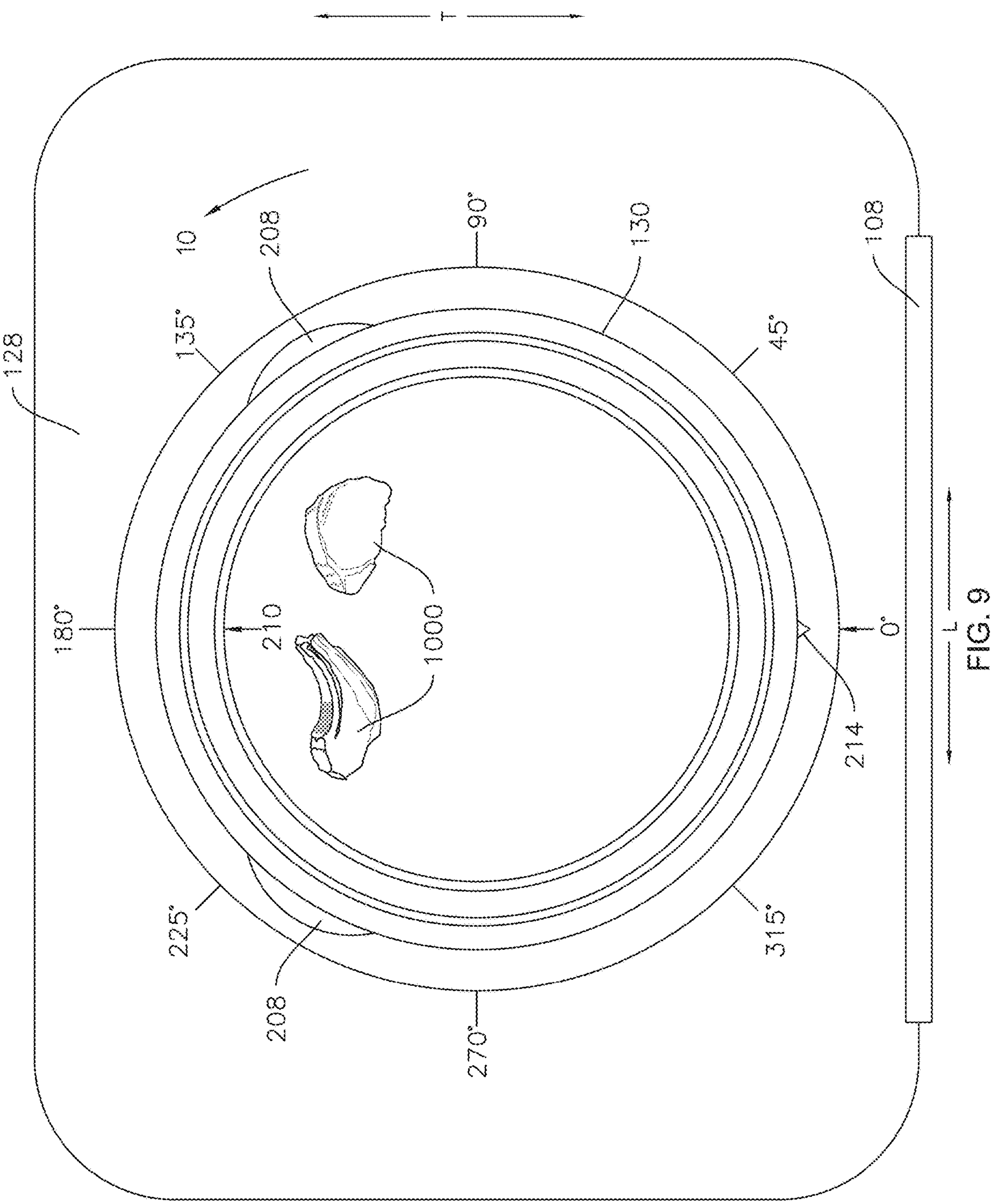
FIG. 9 provides a schematic illustration of an exemplary cooking appliance of FIG. 8 in a back position.

In various embodiments, the plurality of predetermined positions may include the home position, e.g., as illustrated in FIG. 8, wherein the front 210 is proximate the door 108 and a back position, e.g., as illustrated in FIG. 9, wherein the back 214 is proximate the door 108, and the back position may be separated from the home position by about 180°. The back position may be opposite, e.g., diametrically opposite or 180° apart from, the home position. In such embodiments, rotating the turntable 130 to the predetermined one of the plurality of positions at the predetermined time may include rotating the turntable 130 to the home position or the back position. For example, in some embodiments, a food item, e.g., meat 1000, may be positioned on the turntable 130 proximate the front 210 of the turntable 130. Thus, rotating the turntable 130 to the home position may include placing the food item, e.g., meat 1000, proximate to the door 108 to promote access thereto. Such positioning facilitates user interaction with a desired food item, such as flipping a piece of meat 1000, etc. In some embodiments, the cooking appliance 100, e.g., the controller thereof, may be configured to display, e.g., on the display 120, instructions for a user interaction with a food item after rotating the turntable 130 to the predetermined home position.

Figure 10:
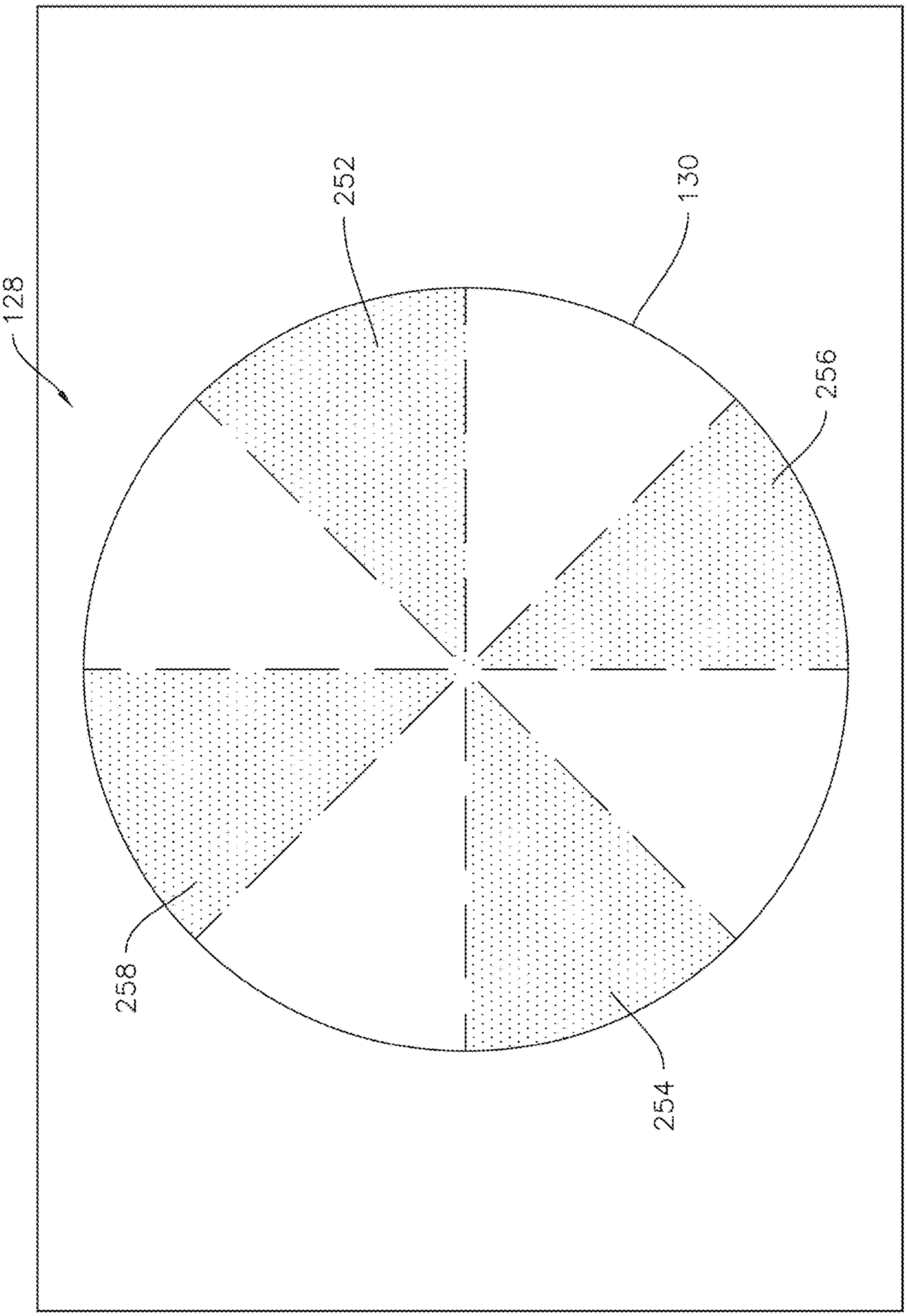
FIG. 10 provides a schematic illustration of varying portions of a plurality of complete revolutions of a turntable of a cooking appliance according to one or more example embodiments of the present subject matter.

Turning now to FIG. 10, a schematic of the cooking appliance 100, e.g., of the cooking cavity 128 thereof and the turntable 130 therein, is provided which depicts varying portions 252, 254, 256, and 258 of the turntable 130 which are directly exposed to microwave energy from the microwave module 160 during successive duty cycles of the microwave module 160. As illustrated in FIG. 10, varying the duty cycle, e.g., the portion of the duty cycle during which the microwave module 160 is activated, permits a different portion of the turntable 130 to be directly exposed to the microwave module 160 and microwave energy therefrom during each of the varied duty cycles.

The example illustrated in FIG. 10 includes a rotation speed that generally corresponds to the duty cycle time, e.g., when the duty cycle is about thirty seconds (30 s) and the rotation speed is about two revolutions per minute (2 RPM), or when the duty cycle is about twenty seconds (20 s) and the rotation speed is about three revolutions per minute (3 RPM), and a one-eighth or 12.5% power level. Thus, where the rotation speed of the turntable 130 generally corresponds to the duty cycle time, a one-eighth portion of the turntable 130 (e.g., encompassing about 45° of the circumference of the turntable 130) will be directly exposed to the microwave module 160 during each duty cycle in the example illustrated in FIG. 10. Accordingly, it should be understood that FIG. 10 illustrates an embodiment wherein the duty cycle of the microwave module 160 is varied throughout the cooking operation. FIG. 10 illustrates four successive duty cycles. During a first duty cycle of the four successive duty cycles, the microwave module may be activated, e.g., ON, during the first one-eighth or 12.5% of the duty cycle, such as, when the total time of the duty cycle is 20 s, from time t=zero to time t=2.5 s during the first duty cycle, whereby the first portion 252 of the turntable 130 is proximate the microwave module 160 while the microwave module 160 is activated during the first duty cycle. During a second duty cycle of the four successive duty cycles, the microwave module may be activated, e.g., ON, during the fifth one-eighth or 12.5% of the duty cycle, such as, when the total time of the duty cycle is 20 s, from time t=10 s to time t=12.5 s during the second duty cycle, whereby the second portion 254 of the turntable 130 is proximate the microwave module 160 while the microwave module 160 is activated during the second duty cycle. During a third duty cycle of the four successive duty cycles, the microwave module may be activated, e.g., ON, during the third one-eighth or 12.5% of the duty cycle, such as, when the total time of the duty cycle is 20 s, from time t=5 s to time t=7.5 s during the third duty cycle, whereby the third portion 256 of the turntable 130 is proximate the microwave module 160 while the microwave module 160 is activated during the third duty cycle. During a fourth duty cycle of the four successive duty cycles, the microwave module may be activated, e.g., ON, during the seventh one-eighth or 12.5% of the duty cycle, such as, when the total time of the duty cycle is 20 s, from time t=15 s to time t=17.5 s during the fourth duty cycle, whereby the fourth portion 258 of the turntable 130 is proximate the microwave module 160 while the microwave module 160 is activated during the fourth duty cycle. As a result, the portions 252, 254, 256, and 258 of the turntable 130 which are directly exposed to the microwave module 160 over the course of the four duty cycles are equal in size and equally spaced around the turntable 130, which may advantageously provide a more even thermal distribution among food items on the turntable 130 during the cooking operation, e.g., as opposed to repeatedly exposing the same portion of the turntable 130 directly to the microwave module 160 during each duty cycle.

Further, it should be understood that additional embodiments may include less than four duty cycles during the cooking operation or more than four duty cycles during the cooking operation. Accordingly, the example illustrated in FIG. 10 is not intended to be limiting. Additional examples may include, e.g., eight duty cycles according to the example described above with respect to FIG. 10, whereby the portions of the turntable 130 which are directly exposed to microwave energy during the eight duty cycles of the cooking operation collectively add up to 360°, e.g., covering the entirety of the turntable 130 such that the each portion of the turntable 130 is directly exposed to the microwave energy at least once during the cooking operation. As another example, the power level may be about 50% and the cooking operation may include at least two duty cycles, such that varying the duty cycle of the microwave module 160 may include activating the microwave module 160 during a first half of a first duty cycle and activating the microwave module 160 during a second half of a second duty cycle. Thus, a first portion of the turntable 130 encompassing 180° may be directly exposed to the microwave module 160 during the first duty cycle and a second portion of the turntable 130 encompassing the other 180° of the turntable 130 may be directly exposed to the microwave module 160 during the second duty cycle, such that the arc lengths of all (both, in this example) of the portions collectively add up to three hundred and sixty degrees.

Figure 11:
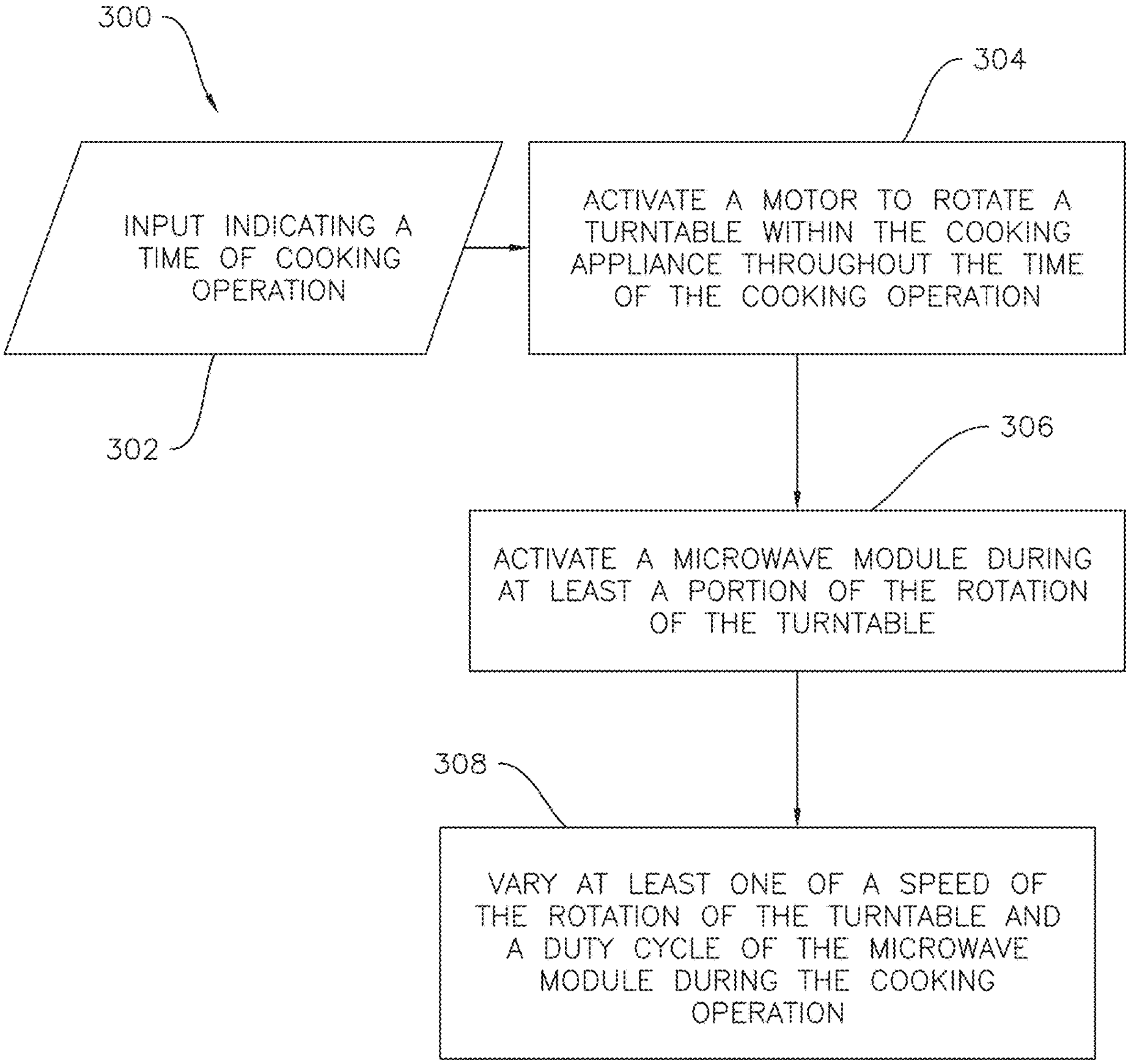
FIG. 11 provides a flow chart diagram illustrating methods of operating a cooking appliance according to one or more additional example embodiments of the present subject matter.

FIG. 11 provides a flow diagram of an example method 300 of operating a cooking appliance according to an example embodiment of the present subject matter. For instance, cooking appliance 100 described herein can be utilized to implement method 300. Accordingly, to provide context to method 300, the numerals used above to denote various features of cooking appliance 100 will be utilized below. The example method 300 described below provides one example manner in which a cooking appliance can be operated, however, the description below is not intended to be limiting. As a further example, as mentioned above, the method 300 may also be used to operate a microwave oven appliance, e.g., a cooking appliance which utilizes only microwave energy for cooking.

At step 302, the method 300 includes receiving, by a controller of the cooking appliance, an input indicating a time of a cooking operation. For instance, the cooking appliance can be the cooking appliance 100 described herein and the controller can be controller 150. After receiving the input at 302, the method 300 may further include a step 304 of activating a motor to rotate a turntable, e.g., turntable 130, within a cooking cavity, e.g., cooking cavity 128, defined in a casing, e.g., casing 102 of the cooking appliance, e.g., cooking appliance 100, throughout the time of the cooking operation.

At step 306, the method 300 includes activating a microwave module 160 to deliver microwave energy into the cooking cavity 128 during at least a portion of the rotation of the turntable 130. The microwave module 160 may be positioned and configured for delivering microwave energy into the cooking cavity 128.

Method 300 may also include, at step 308, varying at least one of a speed of the rotation of the turntable and a duty cycle of the microwave module during the cooking operation.

For example, in some embodiments, the step 308 of varying at least one of the speed of the rotation of the turntable 130 and the duty cycle of the microwave module 160 during the cooking operation may include rotating the turntable 130 at a first speed and rotating the turntable 130 at a second speed higher than the first speed after the rotating the turntable at the first speed. As another example, in additional embodiments, the step 308 of varying at least one of the speed of the rotation of the turntable 130 and the duty cycle of the microwave module 160 during the cooking operation may also or instead include rotating the turntable 130 at a first speed and rotating the turntable 1360 at a second speed (or, in some embodiments, a third speed, e.g., in embodiments which also include the second speed greater than the first speed) lower than the first speed after the rotating the turntable 130 at the first speed.

Some embodiments wherein the speed of rotation of the turntable 130 is varied may include activating the motor to rotate the turntable 130 within the cooking cavity 128 at a first speed during a first portion of the time of the cooking operation and at a second speed different from the first speed during a second portion of the time of the cooking operation. For example, the first speed may be higher than the second speed in some embodiments. Also by way of example, the first speed may be lower than the second speed in other embodiments. For example, the first portion of the time of the cooking operation may occur before the second portion of the time of the cooking operation in some embodiments. Also by way of example, the first portion of the time of the cooking operation may occur after the second portion of the time of the cooking operation in other embodiments.

As another example, in some embodiments, the step 308 of varying at least one of the speed of the rotation of the turntable 130 and the duty cycle of the microwave module 160 during the cooking operation may include varying the duty cycle of the microwave module during the cooking operation as well as or instead of varying the speed of rotation of the turntable 130. In such embodiments, the duty cycle of the microwave module may define a total time duration of the duty cycle. For example, the total time duration of the duty cycle may include an on portion and an off portion, such that varying the duty cycle during the cooking operation may include performing the on portion of the total time duration of a first duty cycle before the off portion of the total time duration of the first duty cycle, followed by performing the on portion of the total time duration of a subsequent duty cycle after the off portion of the total time duration of the subsequent duty cycle. In such embodiments, the first duty cycle may correspond to a first revolution of the turntable 130 and the subsequent duty cycle may correspond to a subsequent revolution of the turntable 130.

In some example embodiments where the step 308 of varying at least one of the speed of the rotation of the turntable 130 and the duty cycle of the microwave module 160 during the cooking operation includes varying the duty cycle of the microwave module 160 during the cooking operation, activating the motor to rotate the turntable 130 within the cooking cavity 128 may include rotating the turntable 130 through a plurality of revolutions. In such embodiments, varying the duty cycle of the microwave module 160 may include activating the microwave module 160 over a portion of each revolution of the plurality of revolutions. In at least some exemplary embodiments, the portions may not overlap. In some embodiments, each portion may define an arc length, and the arc lengths of all of the portions may collectively add up to three hundred and sixty degrees. In some embodiments, an arc length of each portion may be equivalent to an arc length of every other portion.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of operating a cooking appliance, the method comprising:

receiving, by a controller of the cooking appliance, an input indicating a time of a cooking operation;

activating a motor to rotate a turntable at a rotation speed within a cooking cavity defined in a casing of the cooking appliance throughout the time of the cooking operation, whereby the turntable completes a revolution within the cooking cavity in a revolution time;

activating a microwave module to deliver microwave energy into the cooking cavity during at least a portion of the rotation of the turntable, the microwave module located off-center to the cooking chamber, whereby a proximal area of the turntable is directly exposed to the microwave energy from the microwave module while the microwave module is activated and a distal area of the turntable is not directly exposed to the microwave energy from the microwave module while the microwave module is activated; and varying a duty cycle of the microwave module during the cooking operation, wherein the revolution time of the turntable is equal to a total time duration of the duty cycle of the microwave module, the total time duration of the duty cycle of the microwave module comprising an on portion and an off portion, the total time duration of the duty cycle of the microwave module is constant throughout the cooking operation, the total time duration comprising a plurality of equivalent segments, and wherein varying the duty cycle of the microwave module comprises performing the on portion during a first segment of the plurality of equivalent segments of the total time duration during a first iteration of the duty cycle of the microwave module and performing the on portion during a second segment of the plurality of equivalent segments of the total time duration during a second iteration of the duty cycle of the microwave module, whereby the proximal area of the turntable throughout the second iteration of the duty cycle of the microwave module is congruent with and entirely offset from the proximal area of the turntable throughout the first iteration of the duty cycle of the microwave module.

2. The method of claim 1, further comprising, during the cooking operation, rotating the turntable at a first speed and rotating the turntable at a second speed higher than the first speed after the rotating the turntable at the first speed.

3. The method of claim 1, further comprising, during the cooking operation, rotating the turntable at a first speed and rotating the turntable at a second speed lower than the first speed after the rotating the turntable at the first speed.

4. The method of claim 1, wherein the proximal area of the turntable during the first duty cycle and the proximal area of the turntable during the second duty cycle do not overlap.

5. The method of claim 4, wherein the proximal area of the turntable during each duty cycle defines an arc length, and the arc lengths of all of the proximal areas of the turntable during all of the duty cycles collectively add up to three hundred and sixty degrees.

6. The method of claim 4, wherein an arc length of the proximal area of the turntable during each duty cycle is equivalent to an arc length of the proximal area of the turntable during every other duty cycle.

7. A method of operating a cooking appliance, the method comprising:

receiving, by a controller of the cooking appliance, an input indicating a time of a cooking operation;

activating a motor to rotate a turntable within a cooking cavity defined in a casing of the cooking appliance at a first speed during a first portion of the time of the cooking operation and at a second speed different from the first speed during a second portion of the time of the cooking operation; and activating a microwave module to deliver microwave energy into the cooking cavity during the first portion of the time of the cooking operation and deactivating the microwave module during the second portion of the time of the cooking operation, wherein the first speed is higher than the second speed, whereby an entire area of the turntable is directly exposed to the microwave module during the first portion of the time of the cooking operation.

8. The method of claim 7, wherein the first portion of the time of the cooking operation occurs before the second portion of the time of the cooking operation.

9. The method of claim 7, wherein the first portion of the time of the cooking operation occurs after the second portion of the time of the cooking operation.

10. A method of operating a cooking appliance, the method comprising:

receiving, by a controller of the cooking appliance, an input indicating a time of a cooking operation;

activating a motor to rotate a turntable at a rotation speed within a cooking cavity defined in a casing of the cooking appliance throughout the time of the cooking operation, whereby the turntable completes a revolution within the cooking cavity in a revolution time;

activating a microwave module for a plurality of duty cycles to deliver microwave energy into the cooking cavity during at least a portion of the rotation of the turntable, each duty cycle of the microwave module having a total time duration that is equal to the total time duration of every other duty cycle of the plurality of duty cycles of the microwave module; and varying each duty cycle of the plurality of duty cycles of the microwave module during the cooking operation, wherein the revolution time is equal to the total time duration of each duty cycle, the total time duration of each duty cycle comprising an on portion and an off portion, and wherein varying each duty cycle during the cooking operation comprises performing the on portion of the total time duration of a first duty cycle of the plurality of duty cycles before the off portion of the total time duration of the first duty cycle, the first duty cycle contemporaneous with a first revolution of the turntable, followed by performing the on portion of the total time duration of a subsequent duty cycle of the plurality of duty cycles after the off portion of the total time duration of the subsequent duty cycle, the subsequent duty cycle contemporaneous with a subsequent revolution of the turntable, wherein a first area of the turntable is proximate the microwave module during the on portion of the first duty cycle, a second area of the turntable is proximate the microwave module during the on portion of the subsequent duty cycle, and the second area of the turntable is congruent with and offset from the first area of the turntable.

11. The method of claim 10, wherein activating the motor to rotate the turntable within the cooking cavity comprises rotating the turntable through a plurality of revolutions, wherein the on portion of each duty cycle of the plurality of duty cycles of the microwave module the microwave module is contemporaneous with a portion of each revolution of the plurality of revolutions, and the portions do not overlap.

12. The method of claim 11, wherein each portion defines an arc length, and the arc lengths of all of the portions collectively add up to three hundred and sixty degrees.

13. The method of claim 11, wherein an arc length of each portion is equivalent to an arc length of every other portion.

* * * * *